United States Patent
Brand

(10) Patent No.: US 9,686,245 B2
(45) Date of Patent: Jun. 20, 2017

(54) SYSTEM AND METHOD FOR SECURE AUTHENTICATION

(71) Applicant: Entersekt, LLC, Atlanta, GA (US)

(72) Inventor: Christiaan Johannes Petrus Brand, Atlanta, GA (US)

(73) Assignee: ENTERSEKT INTERNATIONAL LIMITED, Ebene (MU)

( * ) Notice: Subject to any disclaimer, the term of this patent is extended or adjusted under 35 U.S.C. 154(b) by 120 days.

(21) Appl. No.: 14/488,160

(22) Filed: Sep. 16, 2014

(65) Prior Publication Data
US 2016/0080326 A1 Mar. 17, 2016

(51) Int. Cl.
| | |
|---|---|
| H04L 29/06 | (2006.01) |
| H04L 9/32 | (2006.01) |
| G06F 21/53 | (2013.01) |
| H04W 12/06 | (2009.01) |

(52) U.S. Cl.
CPC .......... *H04L 63/0428* (2013.01); *G06F 21/53* (2013.01); *H04L 9/321* (2013.01); *H04L 63/08* (2013.01); *H04W 12/06* (2013.01); *H04L 63/0853* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 6,397,333 B1* | 5/2002 | Sohne | ............. | G06F 21/10 |
| | | | | 705/56 |
| 7,181,225 B1* | 2/2007 | Moton, Jr. | ............. | H04W 16/00 |
| | | | | 455/414.2 |
| 8,225,103 B2* | 7/2012 | Chiou | ............. | G06F 21/31 |
| | | | | 704/273 |
| 8,739,260 B1* | 5/2014 | Damm-Goossens | . | H04W 12/06 |
| | | | | 726/4 |
| 2005/0124323 A1* | 6/2005 | Ichihara | ......... | H04M 1/274516 |
| | | | | 455/412.1 |
| 2006/0224742 A1* | 10/2006 | Shahbazi | ............ | H04L 63/20 |
| | | | | 709/226 |

(Continued)

OTHER PUBLICATIONS

"Mobile Proximity Payment Issue and Recommendations; Mobile Payment Configuration and Maintenance", Version 1.0, Oct. 2006, Mobile Payment Forum.

(Continued)

*Primary Examiner* — Trang Doan
(74) *Attorney, Agent, or Firm* — Knobbe Martens Olson and Bear, LLP

(57) ABSTRACT

A system and method for secure authentication performed on a mobile communication device. The method includes an authentication application carrying out the steps of: receiving a unique identifier for a transaction from a first application provided on the same mobile communication device as the authentication application; receiving an encrypted transaction from a remote secure server; decrypting or obtaining decryption of the transaction with a private key of the authentication application; signing or obtaining signing of the transaction with the private key; signing the transaction with the unique identifier; and transmitting the signed transaction back to the remote secure server.

19 Claims, 8 Drawing Sheets

(56) References Cited

U.S. PATENT DOCUMENTS

| | | | |
|---|---|---|---|
| 2007/0033397 A1* | 2/2007 | Phillips, II | H04L 63/045 713/168 |
| 2007/0074027 A1* | 3/2007 | Tung | H04L 9/3247 713/176 |
| 2008/0016347 A1* | 1/2008 | Maj | G06F 21/34 713/168 |
| 2008/0052519 A1* | 2/2008 | Lee | G06Q 10/10 713/176 |
| 2008/0127292 A1* | 5/2008 | Cooper | G06F 21/53 726/1 |
| 2009/0158390 A1* | 6/2009 | Guan | H04L 63/08 726/2 |
| 2010/0058064 A1* | 3/2010 | Kirovski | H04L 9/3073 713/176 |
| 2011/0087690 A1* | 4/2011 | Cairns | G06F 17/30097 707/769 |
| 2012/0023153 A1* | 1/2012 | Karasaridis | H04L 61/1511 709/203 |
| 2012/0108208 A1* | 5/2012 | Willis | H04L 63/0853 455/411 |
| 2012/0136796 A1* | 5/2012 | Hammad | G06Q 20/12 705/67 |
| 2012/0159598 A1* | 6/2012 | Kim | G06F 21/31 726/7 |
| 2013/0055372 A1* | 2/2013 | Chao | G06F 21/31 726/7 |
| 2013/0104197 A1* | 4/2013 | Nandakumar | G06F 21/36 726/4 |
| 2013/0238808 A1* | 9/2013 | Hallem | H04L 69/03 709/227 |
| 2013/0262857 A1* | 10/2013 | Neuman | H04L 63/08 713/155 |
| 2013/0275560 A1* | 10/2013 | Bestmann | H04L 41/0803 709/219 |
| 2013/0276082 A1 | 10/2013 | Kuang et al. | |
| 2013/0298201 A1* | 11/2013 | Aravindakshan | H04L 63/0272 726/4 |
| 2014/0081872 A1 | 3/2014 | Papagrigoriou | |
| 2014/0156531 A1* | 6/2014 | Poon | G06Q 20/4016 705/44 |
| 2014/0157381 A1* | 6/2014 | Disraeli | G06F 21/31 726/7 |
| 2014/0181925 A1* | 6/2014 | Smith | G06F 21/45 726/6 |
| 2014/0280771 A1* | 9/2014 | Bosworth | H04L 67/10 709/219 |
| 2014/0282497 A1* | 9/2014 | Farm | G06F 8/61 717/178 |
| 2014/0317637 A1* | 10/2014 | Gadotti | G06Q 20/322 719/313 |
| 2015/0006392 A1* | 1/2015 | Brand | G06Q 20/38215 705/44 |
| 2015/0052064 A1* | 2/2015 | Karpenko | G06Q 20/3829 705/71 |
| 2015/0088756 A1* | 3/2015 | Makhotin | G06Q 20/3829 705/71 |
| 2015/0227916 A1* | 8/2015 | Inotay | G06Q 20/12 705/71 |
| 2015/0363581 A1* | 12/2015 | Ranadive | G06F 21/34 726/19 |
| 2015/0363602 A1* | 12/2015 | Willis | G06F 21/53 726/26 |

OTHER PUBLICATIONS

Extended European Search Report dated Jan. 26, 2016 of corresponding European Application No. 15185560.8—11 pages.

* cited by examiner

SYSTEM AND METHOD FOR SECURE AUTHENTICATION

BACKGROUND OF THE INVENTION

Field of the Invention

One aspect of the present invention relates to secure authentication in mobile applications, particularly, but not exclusively, for use in banking applications.

Description of the Related Art

Banking applications execute on consumers' mobile communication devices for communication with a banking application server provided by a banking institution. Banking applications provide functionality on mobile communication devices to carry out banking actions and instructions by communication with the banking application server.

Banking applications usually run inside a sandbox on the operating system of the mobile communication device in order to secure the banking application as a separately running application with tightly controlled resources including its own protected memory space with its own data stores.

Additional security authentication is known to be provided by authentication software development kids (SDKs) to embed authentication technology into banking applications.

Such authentication SDKs may use a private key associated with the SDK and enable multi-factor authentication. The private key of the SDK providing the "something I have" factor while a login required by the banking application constitutes the "something I know" factor.

Authentication SDKs also provide out-of-band authentication as communication between a secure gateway, a Federal Information Processing Standard (FIPS) 140-2 hardware device having a cryptography module, and the authentication SDK on the mobile communication device does not use the mobile communication device's cryptography. The channel is completely separate from the mobile communication device's secure sockets layer (SSL), or any SSL that might be implemented natively by the banking application, thereby negating any attacks on the transport layer itself.

However, an authentication SDK typically runs inside the same sandbox as the banking application. This raises the potential security problem that if an attacker were to discover a vulnerability in either the authentication SDK or the banking application, they might potentially be able to compromise the solution.

It would accordingly be beneficial to address this potential problem.

SUMMARY OF THE INVENTION

In accordance with an aspect of the present invention there is provided a method for secure authentication performed on a mobile communication device comprising: an authentication application carrying out the steps of: receiving a unique identifier for a transaction from a first application provided on the same mobile communication device as the authentication application; receiving an encrypted transaction from a remote secure server; decrypting or obtaining decryption of the transaction with a private key of the authentication application; signing or obtaining signing of the transaction with the private key; signing the transaction with the unique identifier; and transmitting the signed transaction back to the remote secure server.

In some embodiments, the private key of the authentication application may be stored by the authentication application and wherein the steps of decrypting the transaction and signing the transaction with the private key are carried out by the authentication application on the mobile communication device. Alternatively, in other embodiments, the private key of the authentication application may be stored on a separate device and the method may include: sending the received transaction to the separate device via a proximity communication; and receiving the transaction signed with the private key at the authentication application via the proximity communication.

A further feature provides for the method to include the first application invoking the authentication application locally and sending the unique identifier to the authentication application. The first application may be a banking application, a mobile banking application, or other application requiring additional authentication for a transaction.

Further features provide for the method to include: the first application carrying out the steps of: sending a transaction request to a remote transaction server, the transaction request having been authenticated using a first factor; and receiving the unique identifier identifying the transaction.

The unique identifier identifies a transaction and identifies a user by a public key corresponding to the private key of the authentication application. In one embodiment, the unique identifier is a 128-byte Globally Unique Identifier (GUID) unique to a transaction and a user.

Further features provide for the method to include the authentication application registering with the remote secure server. The method may also include the authentication application displaying the decrypted transaction before signing the transaction. The method may further include the authentication application carrying out an authorization step including receiving an input from a user and verifying the input before signing the transaction.

The method may include the authentication application passing control back locally to the first application after transmitting the signed transaction back to the secure server.

An illustrative embodiment of the invention provides a system for secure authentication, the system comprising a mobile communication device including: a first application for communicating with a remote application server for carrying out a transaction; an authentication application for communicating with a secure server via a secure protocol for authentication of a transaction; wherein a unique identifier for a transaction is sent locally between the first application and the authentication application via a protocol handler provided at the first application for invoking the authentication application.

Further features provide for the first application to be provided in a first sandbox on the mobile communication device and the authentication application to be provided in a second sandbox on the mobile communication device.

Further features provide for the authentication application to include: a protocol handler for receiving a unique identifier for a transaction from the first application; a receiving component for receiving an encrypted transaction from a remote secure server; a decrypting component for decrypting or obtaining decryption of the transaction with a private key of the authentication application; a first signing component for signing or obtaining signing of the transaction with the private key; a second signing component for signing the transaction with the unique identifier; and a transmitting component for transmitting the signed transaction back to the remote secure server.

The private key of the authentication application may be stored at the authentication application in which case the first and second signing components may be a single component. Alternatively, the private key of the authentication application may be stored on a separate token device, wherein the separate token device includes: a cryptographic component for signing the transaction with the private key; and a proximity communication component capable of communicating with the authentication application.

The first application may include: a transaction request component for sending a transaction request to a remote transaction server, the transaction request having been authenticated using a first factor; and a receiving component for receiving a unique identifier for the transaction.

The authentication application may also include a registering component for registering the authentication application with the remote secure server.

The authentication application may further include a displaying component for displaying the decrypted transaction before signing the transaction.

The authentication application may further include an authorization component for carrying out an authorization step including receiving an input from a user and verifying the input before signing the transaction.

The authentication application may include a control component for passing control back locally to the first application after transmitting the signed transaction back to the secure server.

An illustrative embodiment of the invention also provides a computer program product for secure authentication, the computer program product comprising a computer readable storage medium having computer-readable program code configured to carry out the steps: receiving a unique identifier for a transaction from a first application provided on the same mobile communication device as the authentication application; receiving an encrypted transaction from a remote secure server; decrypting or obtaining decryption of the transaction with a private key of the authentication application; signing or obtaining signing of the transaction with the private key; signing the transaction with the unique identifier; and transmitting the signed transaction back to the remote secure server.

The computer program product may be a software development kit provided to embed authentication procedures in a software application.

Further features provide for the computer program product to comprise a non-transient computer readable storage medium.

In order for the invention to be more fully understood, implementations thereof will now be described with reference to the accompanying drawings.

DETAILED DESCRIPTION OF THE PREFERRED EMBODIMENTS

Systems and methods are described in which an authentication is built into a separate application, referred to as an authentication application, which is separate to a banking application on the same mobile communication device. This has the effect of isolating the authentication functions from the banking application. The banking application and the authentication application each runs in its own protected memory space, has its own protected data stores, and is treated as a separate sandboxed application by the operating system. This ensures that a vulnerability in one of the applications does not result in a breach of the complete system.

Figure 1A:
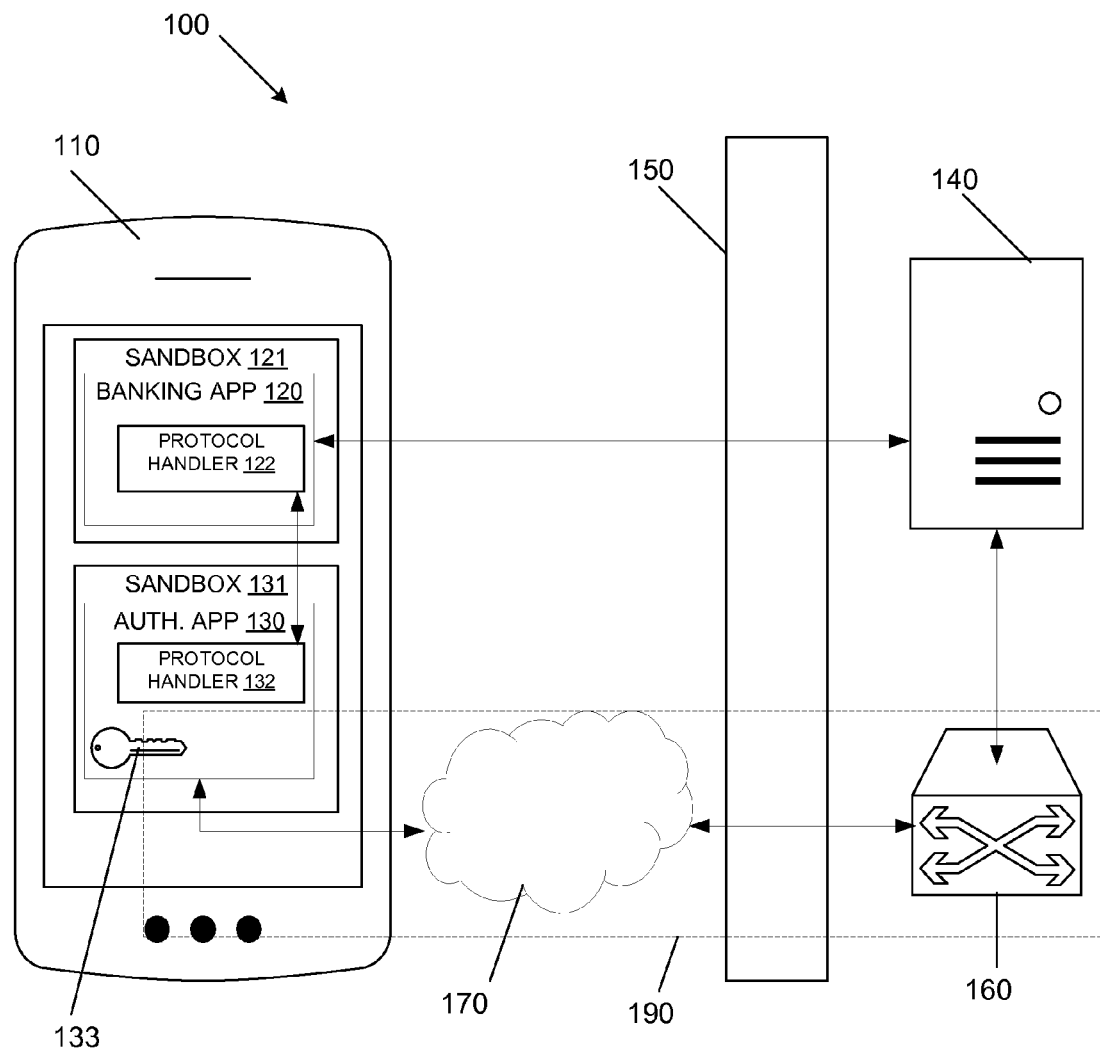
FIG. 1A is a schematic illustration of a first embodiment of a system for secure authentication in accordance with an embodiment of the invention.

FIG. 1A shows a first embodiment of an example system (100) for secure authentication when using a banking application on a mobile communication device. The description refers to a banking application, in particular a mobile banking application, provided on a mobile communication device. However, any form of application requiring authentication may be used in the described system and method.

The system includes a mobile communication device (110) having a banking application (120) and an authentication application (130) in the form of two separate applications each in their own sandbox (121), (131). The banking application (120) and the authentication application (130) may use protocol handlers (122), (132) to enable communication and data exchange between the applications using uniform resource identifiers (URIs).

In the present embodiment, the mobile communication device (110) is a mobile phone; however, other forms of mobile communication device may include a tablet computer, a laptop computer, a personal digital assistant, or the like generally having limited computational capabilities.

The system (100) may include and a mobile application server (140) of a banking institution which communicates with the banking application (120) of the mobile communication device (110) via the banking institution's firewall (150) which applies network security to communication between a mobile communication device (110) and the mobile application server (140).

A secure gateway (160) provided by a secure server may be provided for authentication procedures. The secure gateway (160) may be in communication with the mobile application server (140) and may also be protected by the banking institution's firewall (150). The secure gateway (160) may communicate with the authentication application (130) of the mobile communication device (110) in a mutually secured channel (190). A message router (170) may be provided for routing messages between the secure gateway (160) and the authentication application (130) in the mutually secure channel (190).

The authentication application (130) is installed on the mobile communication device (110), for example, by building an authentication SDK into an application separate to a banking application (120). The mobile communication device (110) includes an encryption module which provides encryption functionality to the authentication application (130). It should be apparent that the encryption module may be compiled as part of the authentication application (130). The authentication application (130) includes a private key (133) for use with the encryption module. The private key (133) may be stored within the sandbox (131) of the authentication application (130).

Figure 1B:
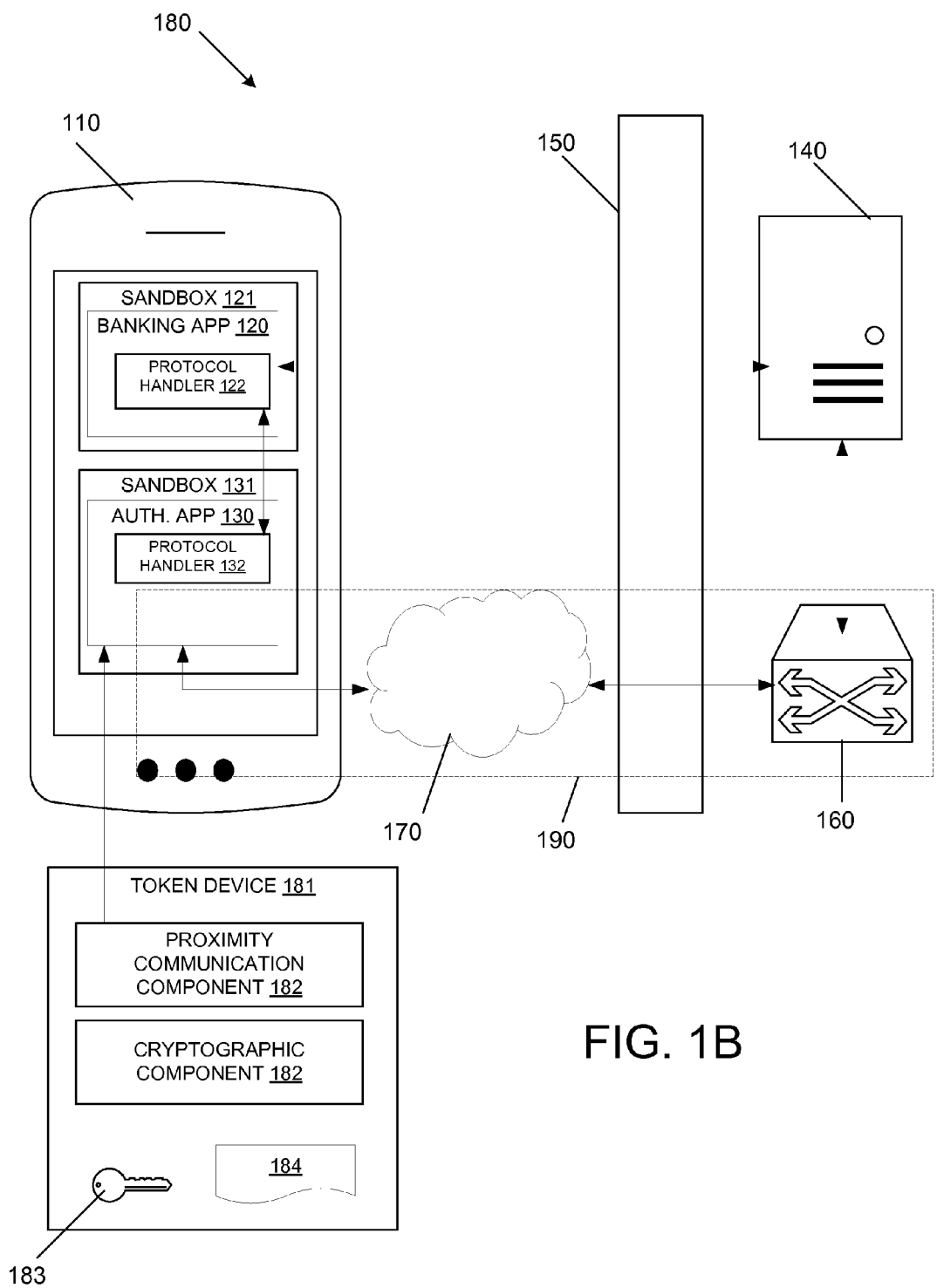
FIG. 1B is a schematic illustration of a second embodiment of a system for secure authentication in accordance with an embodiment of the invention.

FIG. 1B shows a second embodiment of an example system (180) for secure authentication when using a banking application on a mobile communication device. The second embodiment corresponds to the first embodiment shown in FIG. 1A, with the exception that a private key is not stored at the authentication application (130).

In the second embodiment, a separate token device (181) is provided to the user. The token device (181) may be a small self-contained device including a proximity communication component (182) for communication with the authentication application (130) via a proximity communication capability of the mobile communication device (110). The proximity communication component (182) and corresponding communication capability of the mobile communication device (110) may be Bluetooth communication, Bluetooth low energy (LE), or another form of low energy communications protocol.

The token device (181) may include a cryptographic component (185) and may store a private key (183) for use by the cryptographic component (185) on behalf of the authentication application (130).

The authentication application (130) may communicate a received transaction via the proximity communication component (182) for signing with the private key (183) at the token device (181). The token device (181) may then send the signed transaction back to the authentication application (130) using the proximity communication component (182). In this way, the private key (183) is not stored on the mobile communication device (110) increasing security in the event that the mobile communication device (110) is compromised. Optionally, the token device (181) may also store a certificate (184) associated with the private key.

Figure 2:
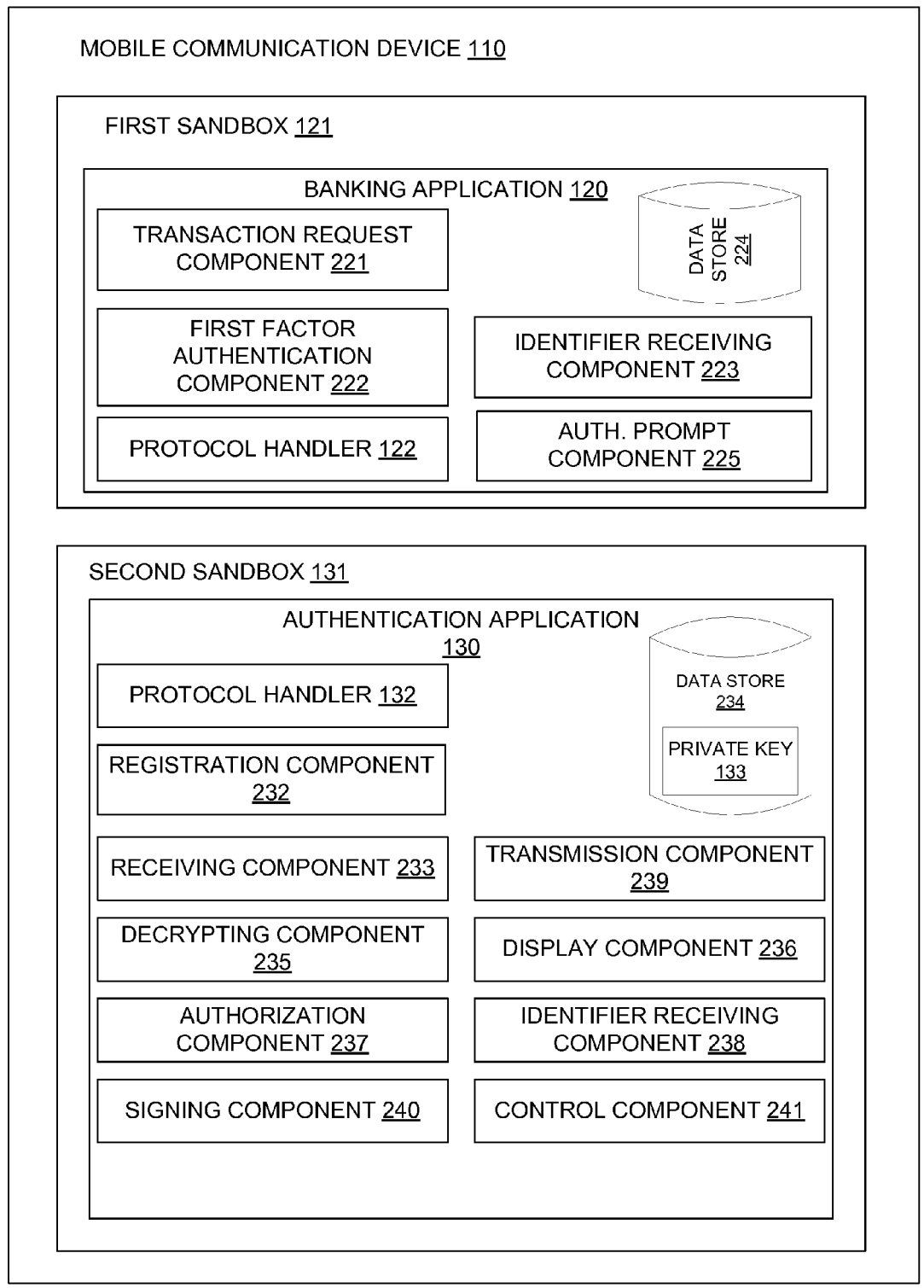
FIG. 2 is a schematic illustration of a mobile communication device for secure authentication in accordance with an embodiment of the invention.

Referring to FIG. 2, a block diagram shows further details of an example embodiment of a mobile communication device (110), the banking application (120), and the authentication application (130) of the embodiment of FIG. 1A.

The banking application (120) may include a transaction request component (221) for requesting a transaction from a mobile application server (140). The banking application (120) may include a first factor authentication component (222), for example, requiring entering of a personal identification number (PIN) by a user.

The banking application (120) may include an identifier receiving component (223) for receiving an identifier for a transaction, for example, in the form of a globally unique identifier (GUID), and storing the identifier in a data store (224) within the sandbox (121) of the banking application (120).

The protocol handler (122) of the banking application (120) may invoke the authentication application (130) when prompted by an authentication prompt component (225) of the banking application (120).

In the illustrated embodiment, the authentication application (130) may include a stored private key (133) stored in a data store (234) within the sandbox (131) of the authentication application (130). As discussed in relation to FIG. 1B, in an alternative embodiment, a separate token device may be provided on which the private key is stored and used and private key signed transactions may be communicated to the authentication application (130) via a proximity communication protocol.

The authentication application (130) may include a protocol handler (132) which may be invoked by the protocol hander (122) of the banking application (120).

The authentication application (130) may include a registration component (232) for registering with the secure gateway (160) and a receiving component (233) for receiving a transaction request from the secure gateway (160). The receiving component (233) and a transmission component (239) may use a mutually secured channel via a message router (170) to the secure gateway (160). The authentication application (130) may include a decrypting component (235) for decrypting the transaction request using the stored private key (133).

Optionally, the authentication application (130) may include a display component (236) for displaying the transaction request to the user. The authentication application (130) may also optionally include an authorization component (237) for receiving a user authentication such as a PIN, challenge, fingerprint scan, etc.

The authentication application (130) may also include an identifier receiving component (238) for receiving an identifier from the banking application (120). The authentication application (130) may include a signing component (240) for signing a transaction request with the private key (133) and with the identifier received from the banking application (120).

The transmission component (239) may transmit the signed transaction request back to the secure gateway (160). A control component (241) may pass control back to the banking application (120) using the protocol handler (132).

The embodiment illustrated by FIG. 1B may have similar components to those shown in FIG. 2; however, a separate token device (181) may be provided in proximity communication with the mobile communication device (110) and therefore the authentication application (130) such that at least some of the functions of the decryption component (235) and the signing component (240) of FIG. 2 are carried out the by token device (181).

Figure 3A:
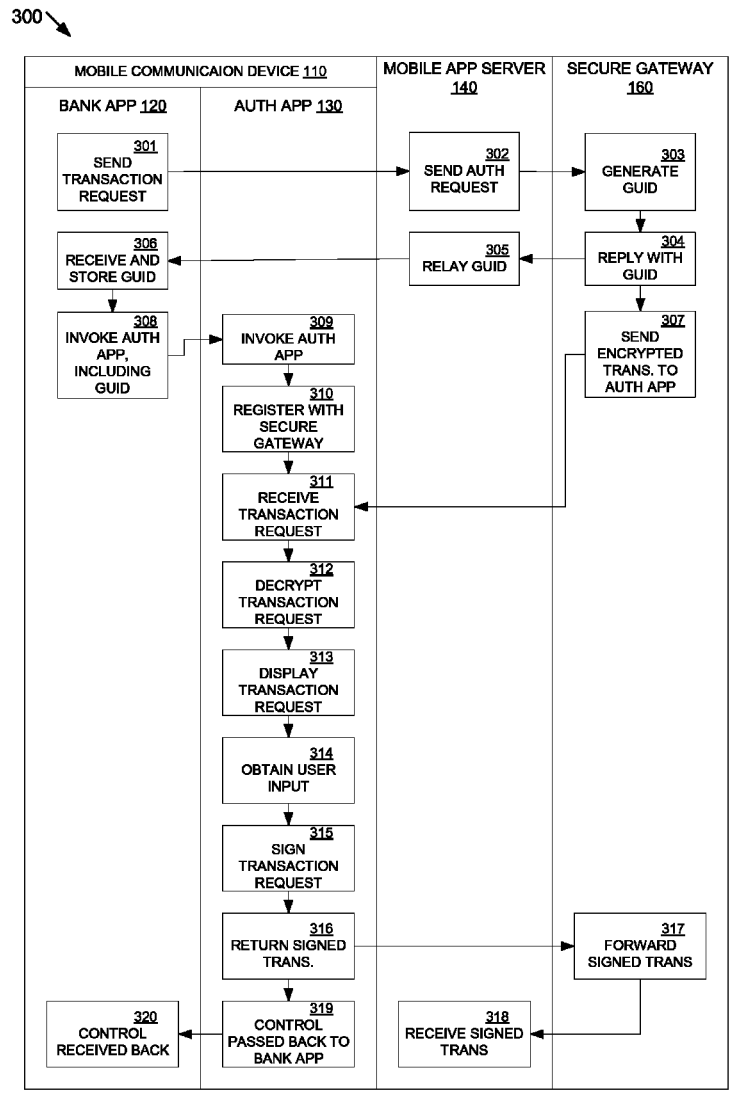
FIG. 3A is a swim-lane flow diagram of a first embodiment of a method for secure authentication in accordance with an embodiment of the invention.
Figure 3B:
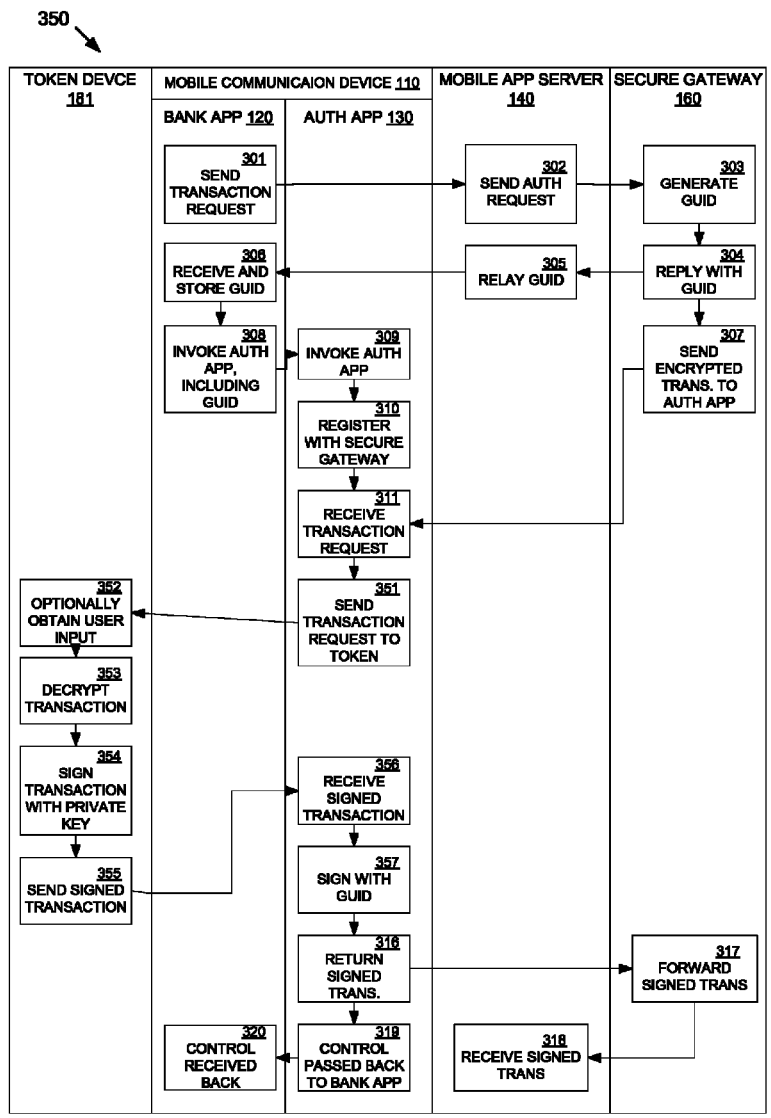
FIG. 3B is a swim-lane flow diagram of a second embodiment of a method for secure authentication in accordance with an embodiment of the invention.

Referring to FIGS. 3A and 3B, swim-lane flow diagram (300, 350) show example embodiments of methods carried out at a mobile communication device (110) at a banking application (120) and at an authentication application (130) both resident on the mobile communication device (110). The swim-lane flow diagram (300) also shows steps carried out at a mobile application server (140) and a secure gateway (160). FIG. 3B additionally shows steps carried out at a token device (181).

The following method describes the authentication of an action. An action in the form of a transaction is described, however a similar method may be carried out for authorization of other actions such as a login, or any other operation requiring step-up authentication.

The banking application (120) sends (301) a transaction request, which has been authenticated using a first factor, to the mobile application server (140).

The mobile application server (140) sends (302) a request for authentication to the secure gateway (160). The request for authentication may contain a reference to the user and the specific transaction to be authenticated.

The secure gateway (160) may generate (303) a 128-byte Globally Unique Identifier (GUID) unique to the specific transaction and user. The GUID may include reference to a public key of the user. The secure gateway (160) may reply (304) to the mobile application server (140) with the GUID.

The mobile application server (140) may relay (305) the GUID back to the banking application (120). The banking application (120) may receive and store (306) the GUID.

The secure gateway (160) sends (307) the encrypted transaction, not including the GUID, to the authentication application (130) via the secured channel. The encrypted transaction may be encrypted end-to-end with the public key corresponding to the private key stored at the authentication application (130).

A uniform resource identifier (URI) handler request is invoked (308) in the banking application (120) to activate the authentication application (120), the request containing the GUID as payload.

Once the authentication application (130) is invoked (309), it registers (310) with the secure gateway (160) and receives (311) the pending transaction request.

At this point the embodiments of FIGS. 3A and 3B differ. In the embodiment of FIG. 3A, the authentication application (130) decrypts (312) the transaction request using its private key. The private key (133) may be stored in the authentication application (130) or may alternatively be obtained from a separate token device (181).

Optionally, the authentication application (130) may display (313) the decrypted transaction request to the user; this may be carried out if "what-you-see-is-what-you-sign" is required.

The authentication application (130) may optionally prompt for and receive a user input (314) in the form of a PIN, challenge, or fingerprint scan.

The authentication application (130) may sign (315) the transaction using the private key of the authentication application (130) and signed with the GUID.

In the embodiment of FIG. 3B, the received transaction request may be sent (351) to the token device (181) using a proximity communication. The authentication application (130) may decrypt the transaction and send (351) the decrypted transaction to the token device (181). Alternatively, the token device (181) may decrypt (353) the transaction request using the private key stored at the token device (181). Optionally, the token device (181) may prompt for and receive a user input (352) before signing (354) the transaction request.

The token device (181) may sign (354) the transaction request using the private key and may send (355) the signed transaction request back to the authentication application (130). The authentication application (130) may receive (356) the private key signed transaction request and additionally sign (357) it with the GUID.

The two methods then continue in the same way with the signed data being returned (316) to the secure gateway (160) which forwards (317) it to the mobile application server (140) where it is received (318) for validation.

Control is automatically passed back (319, 320) from the authentication application (130) to the banking application (120) using a registered URI handler. Thereafter, further processing may be carried out between the banking application (120) and the mobile application server (140).

Figure 4:
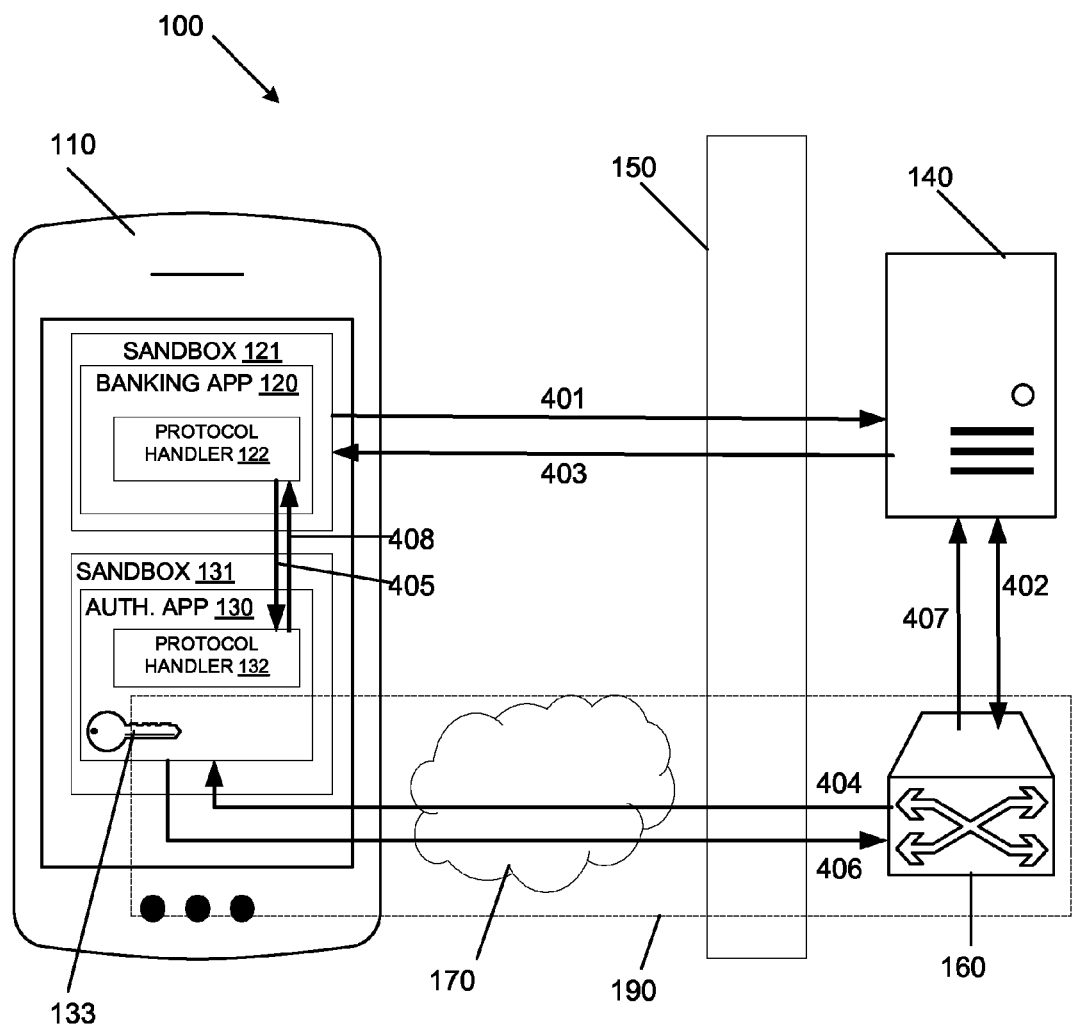
FIG. 4 is a schematic illustration of the system of FIG. 1A including a process flow between the components in accordance with an embodiment of the invention.

Referring to FIG. 4, the system diagram of FIG. 1A is shown with the sequence of method steps shown.

A transaction is sent (401) to the mobile application server (140) from the banking application (120). An authorization GUID is got (402) from the secure gateway (160) valid for the transaction and the user through public key. The authentication GUID is sent (403) to the banking application (120).

An encrypted transaction is sent (404) by the secure gateway (160) to the authentication application (130) to be signed and a reply is expected signed with the private key and the GUID.

The authorization GUID is passed (405) to the authenticator application (130) from the banking application (120) through a URI handler.

The signed transaction is sent (406) back to the secure gateway (160) signed with the private key and the GUID. The signed transaction is returned (407) to the mobile application server (140). Meanwhile, control is sent (408) back through the URI handler from the authentication application (130) to the banking application (120).

Implementing the multi-application solution provides the following advantages.

Multiple factors of authentication is provided. The username/password of the banking application provides a first factor of authentication. The private key stored on the mobile communication device by the authentication application provides a second factor of authentication.

Out-of-band communication is provided. The banking application uses a different communication scheme to the authentication application secure protocol.

Physical separation of banking and authentication applications is provided. This is provided by having the banking application and the authentication application in separate sandboxes on the operating system of the mobile communication device.

Custom application URI handlers can only send data locally providing assurance that both applications are running on the same mobile communication device when the correct signature is received.

Figure 5:
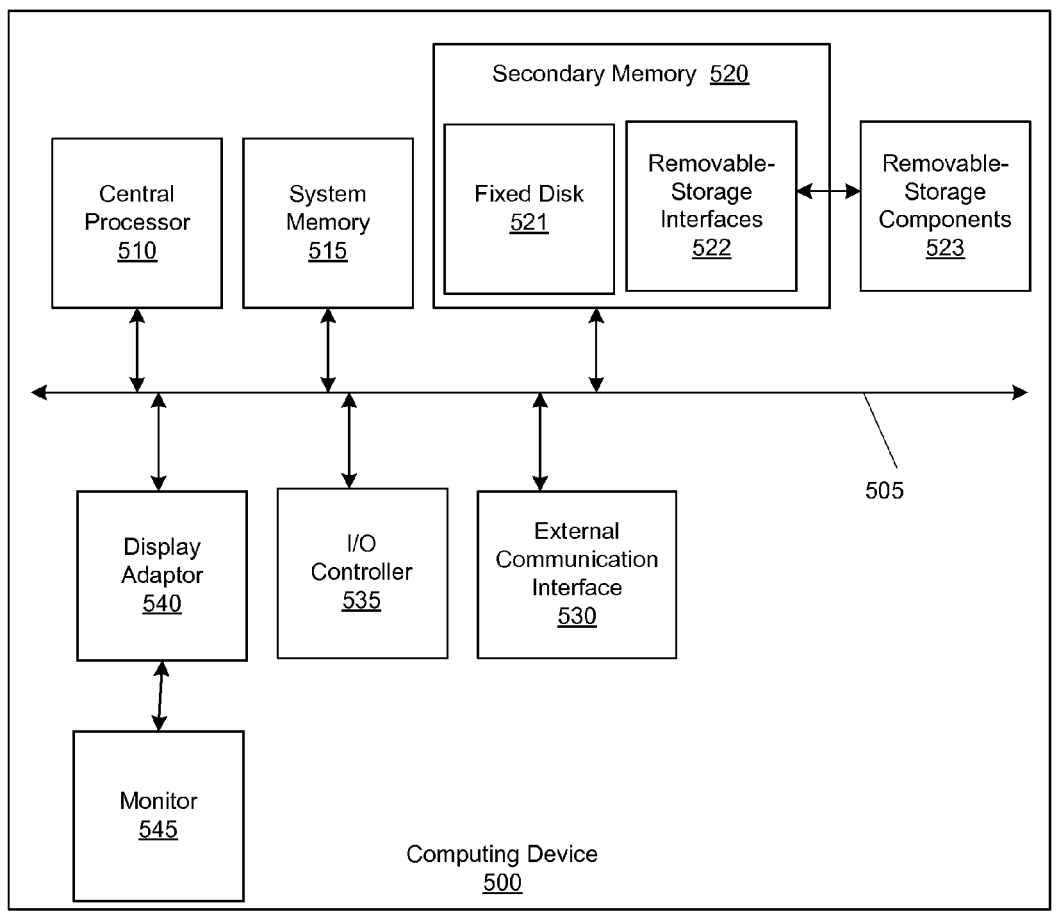
FIG. 5 is a block diagram of a computing device that can be used in various embodiments of the present invention.

FIG. 5 illustrates an example of a computing device (500) in which various aspects of the disclosure may be implemented, for example, the mobile application server and the secure gateway. The computing device (500) may be suitable for storing and executing computer program code. The various participants and elements in the previously described system diagrams may use any suitable number of subsystems or components of the computing device (500) to facilitate the functions described herein.

The computing device (500) may include subsystems or components interconnected via a communication infrastructure (505) (for example, a communications bus, a cross-over bar device, or a network). The computing device (500) may include at least one central processor (510) and at least one memory component in the form of computer-readable media.

The memory components may include system memory (515), which may include read only memory (ROM) and random access memory (RAM). A basic input/output system (BIOS) may be stored in ROM. System software may be stored in the system memory (515) including operating system software.

The memory components may also include secondary memory (520). The secondary memory (520) may include a fixed disk (521), such as a hard disk drive, and, optionally, one or more removable-storage interfaces (522) for removable-storage components (523).

The removable-storage interfaces (522) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (522) may also be in the form of ports or sockets for interfacing with other forms of removable-storage components (523) such as a flash memory drive, external hard drive, or removable memory chip, etc.

The computing device (500) may include an external communications interface (530) for operation of the computing device (500) in a networked environment enabling transfer of data between multiple computing devices (500). Data transferred via the external communications interface (530) may be in the form of signals, which may be electronic, electromagnetic, optical, radio, or other types of signal.

The external communications interface (530) may enable communication of data between the computing device (500) and other computing devices including servers and external storage facilities. Web services may be accessible by the computing device (500) via the communications interface (530).

The external communications interface (530) may also enable other forms of communication to and from the computing device (500) including connection to communication channels using: a cellular telephone network, data transmission network, Wi-Fi network, satellite-phone network, Internet network, Satellite Internet Network, etc. The external communications interface (530) may also enable other forms of proximity communication such as near field communication, Bluetooth communication, etc.

The computer-readable media in the form of the various memory components may provide storage of computer-executable instructions, data structures, program modules, and other data. A computer program product may be provided by a computer-readable medium having stored computer-readable program code executable by the central processor (510).

A computer program product may be provided by a non-transient computer-readable medium, or may be provided via a signal or other transient means via the communications interface (530).

Interconnection via the communication infrastructure (505) allows a central processor (510) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (500) either directly or via an I/O controller (535). These components may be connected to the computing device (500) by any number of means known in the art, such as a serial port.

One or more monitors (545) may be coupled via a display or video adapter (540) to the computing device (500).

Figure 6:
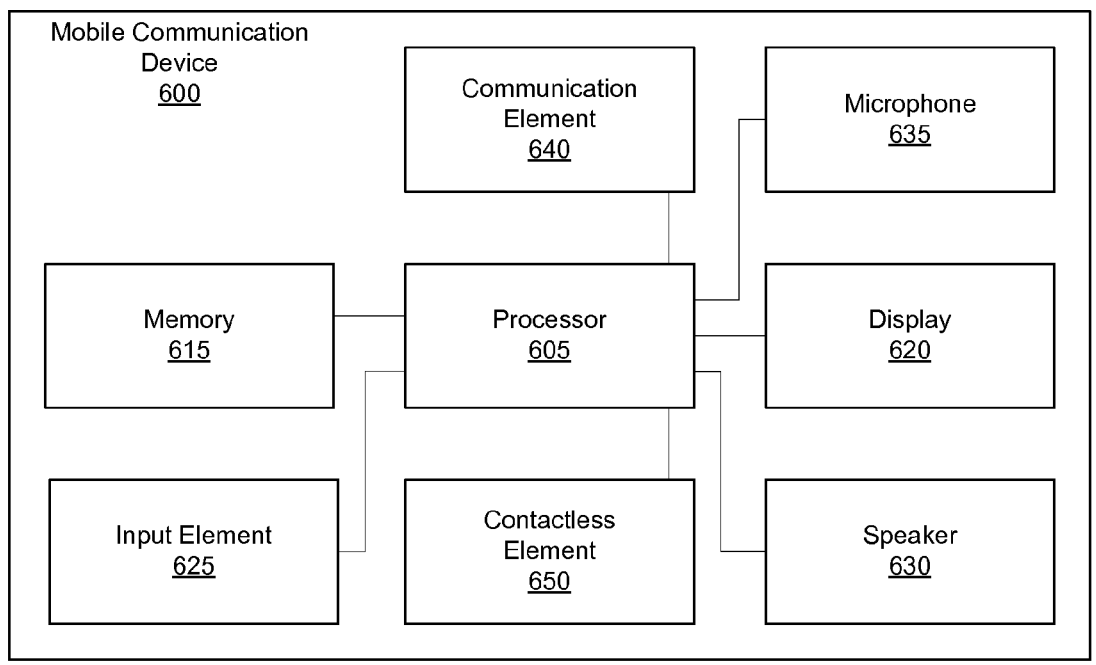
FIG. 6 is a block diagram of a mobile communication device that can be used in various embodiments of the present invention.

FIG. 6 shows a block diagram of a mobile communication device (600) that may be used in embodiments of the disclosure. The mobile communication device (600) may be a cell phone, a feature phone, a smart phone, a satellite phone, or a computing device having a phone capability.

The mobile communication device (600) may include a processor (605) (e.g., a microprocessor) for processing the functions of the mobile communication device (600) and a display (620) to allow a user to see the phone numbers and other information and messages. The mobile communication device (600) may further include an input element (625) to allow a user to input information into the device (e.g., input buttons, touch screen, etc.), a speaker (630) to allow the user to hear voice communication, music, etc., and a microphone (635) to allow the user to transmit his or her voice through the mobile communication device (600).

The processor (605) of the mobile communication device (600) may connect to a memory (615). The memory (615) may be in the form of a computer-readable medium that stores data and, optionally, computer-executable instructions.

The mobile communication device (600) may also include a communication element (640) for connection to communication channels (e.g., a cellular telephone network, data transmission network, Wi-Fi network, satellite-phone network, Internet network, Satellite Internet Network, etc.). The communication element (640) may include an associated wireless transfer element, such as an antenna.

The communication element (640) may include a subscriber identity module (SIM) in the form of an integrated circuit that stores an international mobile subscriber identity and the related key used to identify and authenticate a subscriber using the mobile communication device (600). One or more subscriber identity modules may be removable from the mobile communication device (600) or embedded in the mobile communication device (600).

The mobile communication device (600) may further include a contactless element (650), which is typically implemented in the form of a semiconductor chip (or other data storage element) with an associated wireless transfer element, such as an antenna. The contactless element (650) may be associated with (e.g., embedded within) the mobile communication device (600) and data or control instructions transmitted via a cellular network may be applied to the contactless element (650) by means of a contactless element interface (not shown). The contactless element interface may function to permit the exchange of data and/or control instructions between mobile communication device circuitry (and hence the cellular network) and the contactless element (650).

The contactless element (650) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the mobile communication device (600) and an interrogation device. Thus, the mobile communication device (600) may be capable of communicating and transferring data and/or control instructions via both a cellular network and near field communications capability.

The data stored in the memory (615) may include: operation data relating to the operation of the mobile communication device (600), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the mobile communication device (600) to selected receivers.

The mobile communication device (600) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

The foregoing description of the embodiments of the invention has been presented for the purpose of illustration, and is not intended to be exhaustive or to limit the invention to the precise forms disclosed. Persons skilled in the relevant art can appreciate that many modifications and variations are possible in light of the above disclosure, which fall within the scope of the invention.

What is claimed is:

1. A method for secure authentication performed by an authentication application on a mobile communication device, the method comprising the authentication application carrying out the following:
   receiving, via an authentication application protocol handler, a unique identifier for a transaction from a first application provided on the same mobile communication device as the authentication application, wherein the first application communicates with a remote application server for carrying out the transaction and wherein the unique identifier is sent locally between the first application and the authentication application via a first application protocol handler provided at the first application for invoking the authentication application;
   receiving an encrypted transaction from a remote secure server;
   decrypting or obtaining decryption of the transaction with a private key of the authentication application;
   signing or obtaining signing of the transaction with the private key;
   signing the transaction with the unique identifier received from the first application; and
   transmitting the signed transaction back to the remote secure server,
   wherein the authentication application communicates with the remote secure server via a secure protocol for authentication of the transaction.

2. The method as claimed in claim 1, wherein the private key of the authentication application is stored by the authentication application and wherein the steps of decrypting the transaction and signing the transaction with the private key are carried out by the authentication application on the mobile communication device.

3. The method as claimed in claim 1, wherein the private key of the authentication application is stored by a separate device and including:
   sending the received transaction to the separate device via a proximity communication; and
   receiving the transaction signed with the private key at the authentication application via the proximity communication.

4. The method as claimed in claim 1 wherein the method includes:
   the first application invoking the authentication application locally and sending the unique identifier to the authentication application.

5. The method as claimed in claim 1, wherein the method includes:
   the first application carrying out the steps of:
   sending a transaction request to a remote transaction server, the transaction request having been authenticated using a first factor; and
   receiving the unique identifier identifying the transaction.

6. The method as claimed in claim 1, wherein the unique identifier identifies a transaction and identifies a user by a public key corresponding to the private key of the authentication application.

7. The method as claimed in claim 1, wherein the method includes:
   the authentication application displaying the decrypted transaction before signing the transaction.

8. The method as claimed in claim 1, wherein the method includes:
   the authentication application carrying out an authorization step including receiving an input from a user and verifying the input before signing the transaction.

9. The method as claimed in claim 1, wherein the method includes:
   the authentication application passing control back locally to the first application after transmitting the signed transaction back to the secure server.

10. A system for secure authentication, the system comprising a mobile communication device including:
    a first application for communicating with a remote application server for carrying out a transaction; and
    an authentication application for communicating with a secure server via a secure protocol for authentication of a transaction;
    wherein a unique identifier for a transaction is sent locally between the first application and the authentication application via a first application protocol handler provided at the first application for invoking the authentication application, and
    wherein the authentication application includes:

an authentication application protocol handler for receiving a unique identifier for a transaction from the first application;
a receiving component for receiving an encrypted transaction from a remote secure server;
a decrypting component for decrypting or obtaining decryption of the transaction with a private key of the authentication application;
a first signing component for signing or obtaining signing of the transaction with the private key;
a second signing component for signing the transaction with the unique identifier; and
a transmitting component for transmitting the signed transaction back to the remote secure server.

11. The system as claimed in claim 10, wherein the first application is provided in a first sandbox on the mobile communication device and the authentication application is provided in a second sandbox on the mobile communication device.

12. The system as claimed in claim 10, wherein the private key of the authentication application is stored at the authentication application and the first and second signing components are provided by a single component.

13. The system as claimed in claim 10, wherein the private key of the authentication application is stored on a separate token device, wherein the separate token device includes:
a cryptographic component for signing the transaction with the private key; and
a proximity communication component capable of communicating with the authentication application.

14. The system as claimed in claim 10, wherein the first application includes:
a transaction request component for sending a transaction request to a remote transaction server, the transaction request having been authenticated using a first factor; and
a receiving component for receiving a unique identifier for the transaction.

15. The system as claimed in claim 10, wherein the authentication application includes:
a displaying component for displaying the decrypted transaction before signing the transaction.

16. The system as claimed in claim 10, wherein the authentication application includes:
an authorization component for carrying out an authorization step including receiving an input from a user and verifying the input before signing the transaction.

17. The system as claimed in claim 10, wherein the authentication application includes:
a control component for passing control back locally to the first application after transmitting the signed transaction back to the secure server.

18. A computer program product for secure authentication performed by an authentication application on a mobile communication device, the computer program product comprising a non-transitory computer readable storage medium having computer-readable program code configured to cause the authentication application to carry out the following:
receiving, via an authentication application protocol handler, a unique identifier for a transaction from a first application provided on the same mobile communication device as the authentication application, wherein the first application communicates with a remote application server for carrying out the transaction and wherein the unique identifier is sent locally between the first application and the authentication application via a first application protocol handler provided at the first application for invoking the authentication application;
receiving an encrypted transaction from a remote secure server;
decrypting or obtaining decryption of the transaction with a private key of the authentication application;
signing or obtaining signing of the transaction with the private key;
signing the transaction with the unique identifier received from the first application; and
transmitting the signed transaction back to the remote secure server,
wherein the authentication application communicates with the remote secure server via a secure protocol for authentication of the transaction.

19. The computer program product as claimed in claim 18, wherein the computer program product comprises the non-transitory computer-readable storage medium, which is a software development kit provided to embed authentication procedures in a software application.

* * * * *